United States Patent
Kido et al.

(10) Patent No.: US 9,245,552 B2
(45) Date of Patent: *Jan. 26, 2016

(54) HEAD GIMBAL ASSEMBLY AND DISK DEVICE WITH THE SAME

(71) Applicant: KABUSHIKI KAISHA TOSHIBA, Minato-ku, Tokyo (JP)

(72) Inventors: Takuma Kido, Mitaka (JP); Yasutaka Sasaki, Yokohama (JP); Masaya Kudo, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/616,479

(22) Filed: Feb. 6, 2015

(65) Prior Publication Data
US 2015/0243309 A1     Aug. 27, 2015

Related U.S. Application Data

(63) Continuation of application No. 14/300,963, filed on Jun. 10, 2014, now Pat. No. 8,988,831.

(30) Foreign Application Priority Data

Feb. 21, 2014    (JP) ................................ 2014-031427

(51) Int. Cl.
    *G11B 5/58*        (2006.01)
    *G11B 5/48*        (2006.01)
    *G11B 5/55*        (2006.01)

(52) U.S. Cl.
    CPC ................ *G11B 5/486* (2013.01); *G11B 5/482* (2013.01); *G11B 5/4853* (2013.01); *G11B 5/5552* (2013.01)

(58) Field of Classification Search
CPC .. G11B 5/5552; G11B 5/4873; G11B 5/4853; G11B 5/596; G11B 5/56; G11B 5/482; G11B 5/486
USPC .......... 360/234.5, 234.6, 245.8, 245.9, 294.3, 360/294.4
See application file for complete search history.

(56) References Cited

U.S. PATENT DOCUMENTS

| | | | |
|---|---|---|---|
| 6,459,548 B1 * | 10/2002 | Shiraishi et al. | 360/245.9 |
| 6,751,843 B2 * | 6/2004 | Girard | 29/603.03 |
| 7,292,413 B1 | 11/2007 | Coon | |
| 7,417,831 B2 | 8/2008 | Yao et al. | |

(Continued)

FOREIGN PATENT DOCUMENTS

| | | |
|---|---|---|
| JP | 3785329 B2 | 6/2006 |
| JP | 2011-138596 A | 7/2011 |
| JP | 4790053 B2 | 10/2011 |

*Primary Examiner* — Will J Klimowicz
(74) *Attorney, Agent, or Firm* — Knobbe, Martens, Olson & Bear, LLP

(57) ABSTRACT

According to an embodiment, a head gimbal assembly includes a support plate, a wiring member, a magnetic head and drive members. A gimbal portion of the wiring member includes a thin metallic plate including a tongue portion mounted with a magnetic head, a proximal end portion fixed to the support plate, support projections, and link portions, an insulating layer including first bridge portions extending from the proximal end portion to the tongue portion, and second bridge portions extending from the proximal end portion to middle portions of the first bridges, and a conducive layer including signal wirings extending to the tongue portion through the second and first bridge portions, and reinforcement wiring portions. The drive members are provided at the first bridge portions.

18 Claims, 13 Drawing Sheets

(56) References Cited

U.S. PATENT DOCUMENTS

| | | |
|---|---|---|
| 7,468,869 B2 | 12/2008 | Yao et al. |
| 7,719,798 B2 | 5/2010 | Yao |
| 7,957,101 B2 | 6/2011 | Matsui et al. |
| 8,159,786 B2 * | 4/2012 | Yao et al. .................... 360/245.9 |
| 8,248,735 B2 | 8/2012 | Fujimoto et al. |
| 8,446,694 B1 | 5/2013 | Tian et al. |
| 8,488,281 B1 | 7/2013 | Pan |
| 8,570,687 B2 | 10/2013 | McCaslin et al. |
| 8,705,210 B2 | 4/2014 | Arai |
| 8,970,990 B2 * | 3/2015 | Takikawa et al. .......... 360/294.4 |
| 8,988,831 B1 * | 3/2015 | Kido et al. ................. 360/245.9 |
| 2008/0094756 A1 | 4/2008 | Makino et al. |
| 2011/0096438 A1 * | 4/2011 | Takada et al. .............. 360/244.2 |
| 2011/0211274 A1 | 9/2011 | Kuwajima |
| 2014/0022674 A1 | 1/2014 | Takikawa et al. |

* cited by examiner

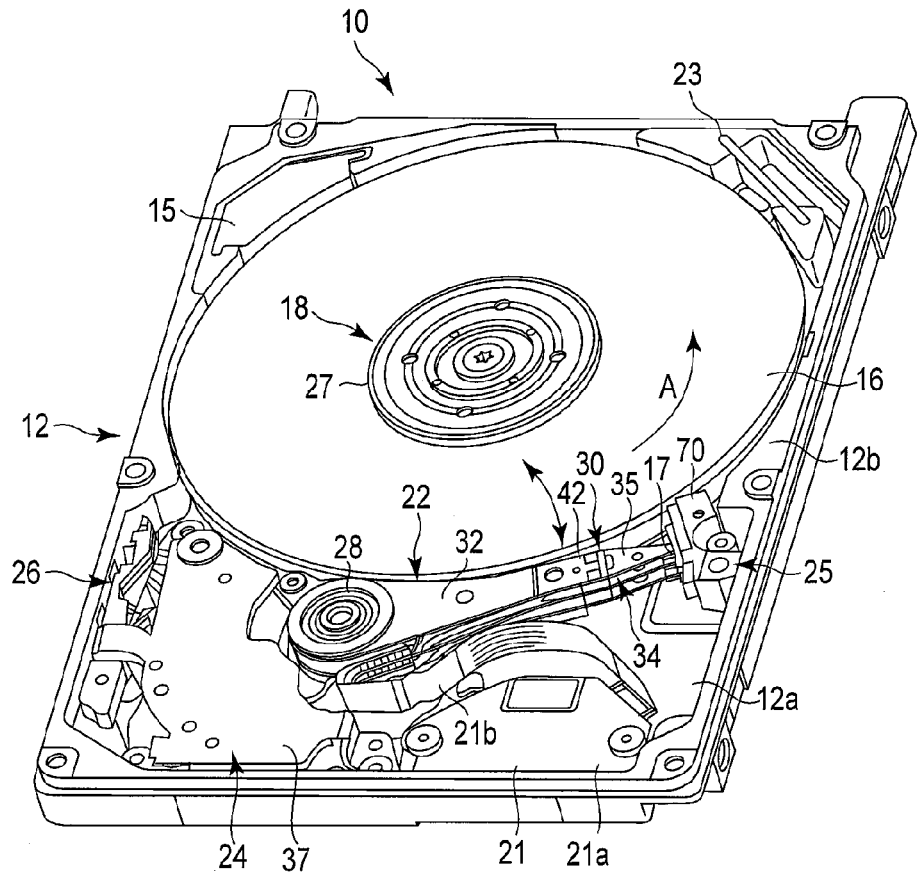
F I G. 1
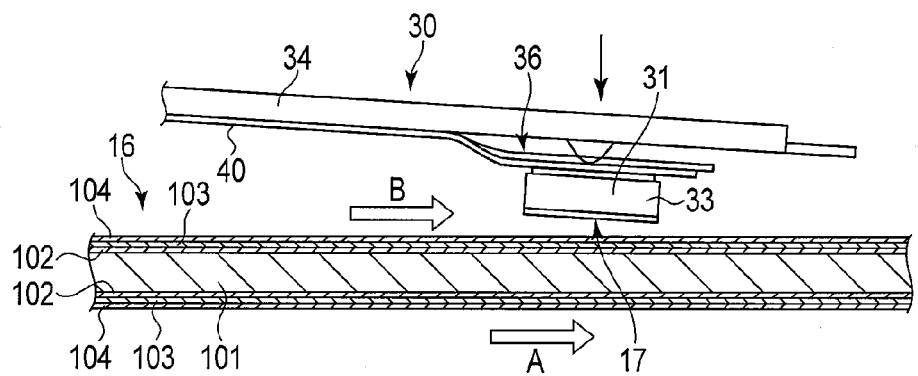
F I G. 2

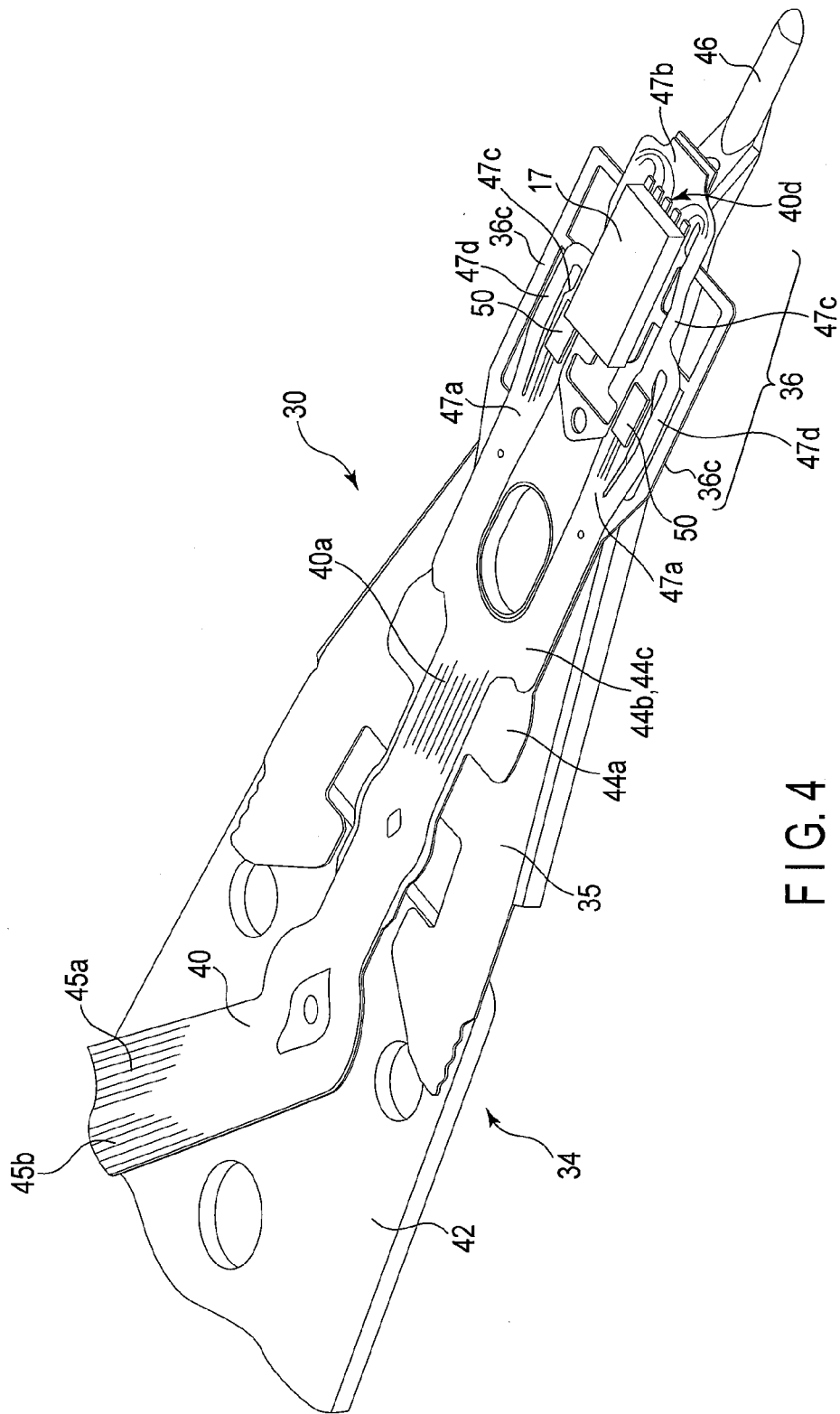
F I G. 4

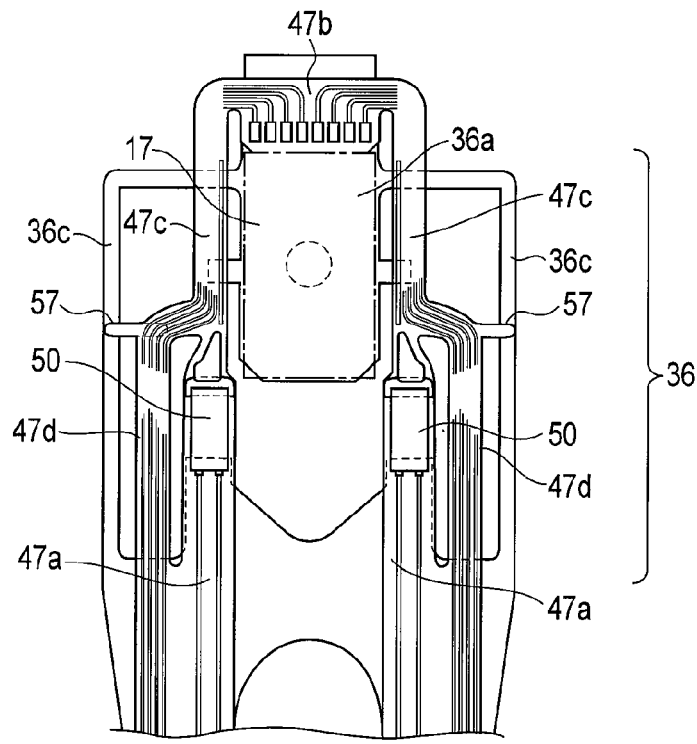
F I G. 12
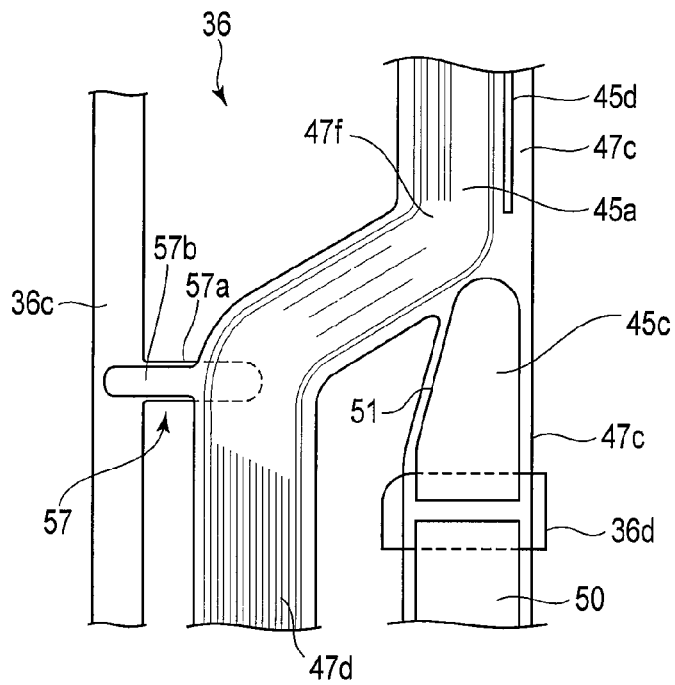
F I G. 13

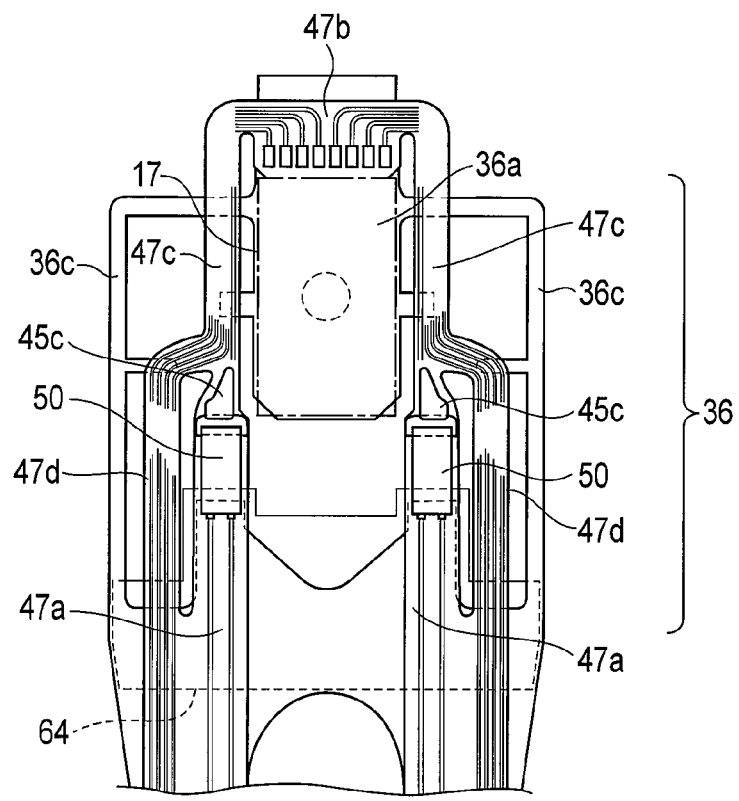
F I G. 19
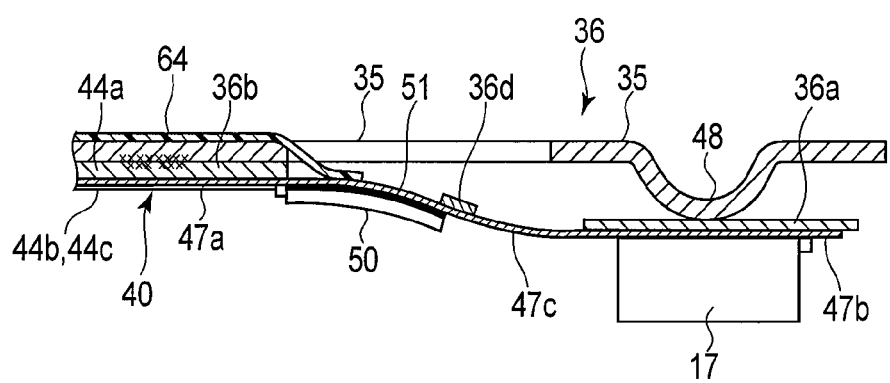
F I G. 20

100
HEAD GIMBAL ASSEMBLY AND DISK DEVICE WITH THE SAME

CROSS-REFERENCE TO RELATED APPLICATIONS

This application is a continuation of U.S. application Ser. No. 14/300,963, filed on Jun. 10, 2014 and titled "HEAD GIMBAL ASSEMBLY AND DISK DEVICE WITH THE SAME" the entire contents of which are incorporated herein by reference and is based upon and claims the benefit of priority from Japanese Patent Application No. 2014-031427, filed Feb. 21, 2014, the entire contents of which are incorporated herein by reference.

FIELD

Embodiments described herein relate generally to a head gimbal assembly to be applied to a disk device, and also a disk device provided with the head gimbal assembly.

BACKGROUND

In recent years, disk devices such as magnetic disk drives and optical disk drives have widely been used as external storage devices of computers and image recording devices.

As such a disk device, for example, a magnetic disk drive generally comprises a magnetic disk provided in a case, a spindle motor which supports and rotates the magnetic disk, and a head gimbal assembly (HGA) which supports a magnetic head. The head gimbal assembly includes a suspension attached to a distal end portion of an arm, a wiring member (a flexure or a wiring trace) provided on the suspension, and a magnetic head supported by the suspension through a gimbal portion of the wiring member. The wiring member includes wirings electrically connected to the magnetic head.

In recent years, there is proposed an HGA wherein thin piezoelectric elements (PZT elements) serving as drive members are mounted in the vicinity of a gimbal portion of a wiring member, and a magnetic head is minutely displaced in a seek direction by expansion and contraction of the piezoelectric elements. According to the HGA, the operation of the magnetic head can be minutely controlled by controlling a voltage to be applied to the piezoelectric elements.

In the HGA, when a disk device is impacted, there is a possibility that a stress acts with concentration on the wiring member or drive members, and thus the wiring members or drive members may be damaged.

BRIEF DESCRIPTION OF THE DRAWINGS

FIG. 1 is a perspective view showing a hard disk drive (HDD) according to a first embodiment;

FIG. 2 is a side view showing a magnetic disk, a suspension and a magnetic head of a head gimbal assembly in the HDD;

FIG. 4 is a perspective view showing the head gimbal assembly;

FIG. 12 is a plan view showing a gimbal portion of a head gimbal assembly according to a second embodiment;

FIG. 13 is a plan view showing an auxiliary bridge portion in a head gimbal assembly according to a third modification;

FIG. 19 is a plan view showing a gimbal portion of a head gimbal assembly according to a seventh embodiment; and FIG. 20 is a cross-sectional view of the gimbal portion of the head gimbal assembly according to the seventh embodiment.

DETAILED DESCRIPTION

Figure 3:
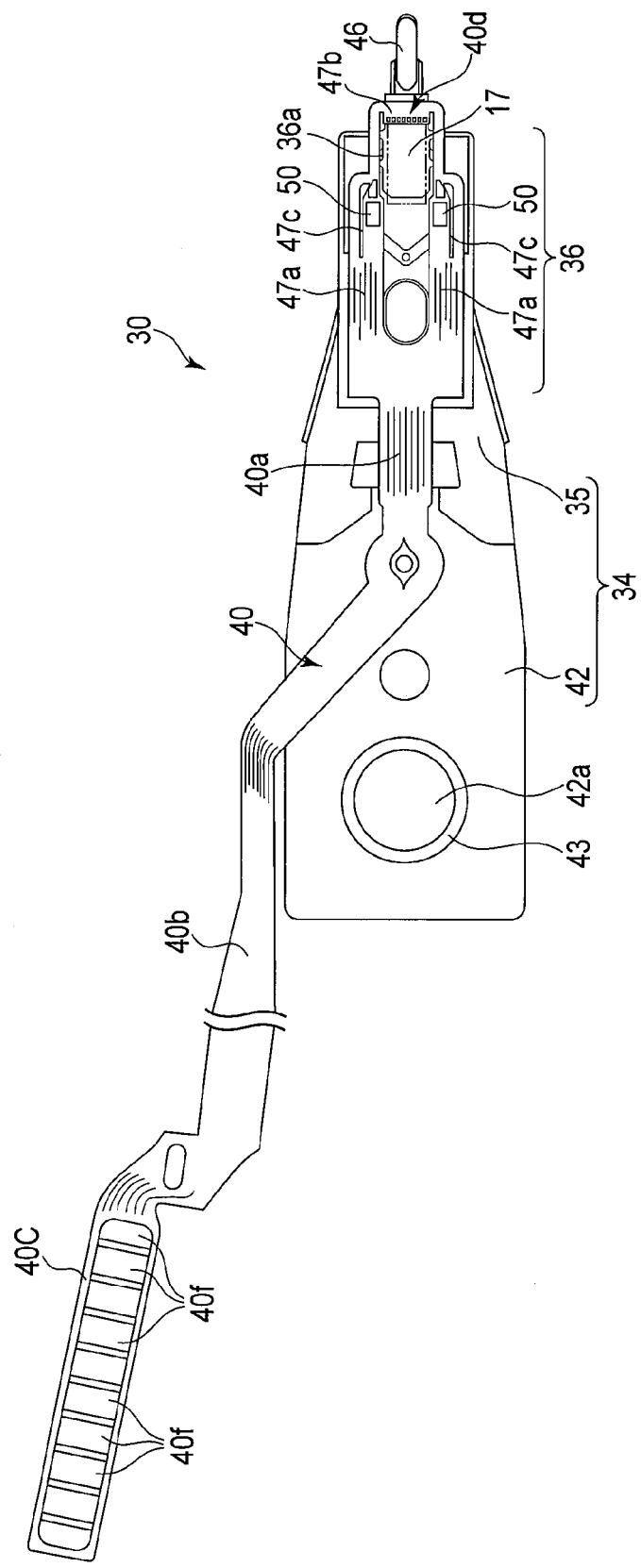
FIG. 3 is a plan view of the head gimbal assembly.

Various embodiments will be described hereinafter with reference to the accompanying drawings. In general, according to one embodiment, a head gimbal assembly comprises a support plate including a distal end portion having a convex portion;

a wiring member attached to the support plate and comprising a thin metallic plate, an insulating layer on the thin metallic plate and a conductive layer on the insulating layer to form a plurality of wirings, the wiring member comprising a gimbal portion located at the distal end portion of the support plate; wherein, at the gimbal portion, the thin metallic plate comprises a proximal end portion fixed to the support plate, a tongue portion located apart from the proximal end portion and located at the convex portion, a pair of support projections projecting from both sides of the tongue portion and located close to the convex portion, and a pair of link portions extending along the both sides of the tongue portion and connecting the proximal end portion and the tongue portion; the insulating layer comprises a distal end portion on the tongue portion, a pair of first bridges extending side by side with the link portions from the proximal end portion to the distal end portion of the insulating layer along the both sides of the tongue portion and each having a part fixed to the support projection, and a pair of second bridges extending side by side with the first bridge portions from the proximal end to middle portions of the first bridge portions to join the first bridge portions; and the conductive layer comprises a plurality of signal wirings extending from the proximal end portion to the distal end portion of the insulating layer through the second bridge portions and the first bridge portions, a plurality of drive wirings, and reinforcement wiring portions provided at the first bridge portions and close to joining portions of the first and second bridge portions;

a magnetic head attached to the tongue portion and electrically connected to the signal wirings of the wiring member; and drive members fixed to the first bridges in positions between the proximal end portion and the joining portions, connected to the drive wirings, and configured to expand and contract by an applied voltage in a longitudinal direction of the first bridge portions.

A hard disk drive (HDD) according to an embodiment, which functions as a magnetic disk device, will be explained with reference to the accompanying drawings.

First Embodiment

FIG. 1 shows an internal structure of an HDD, with a top cover detached therefrom, and FIG. 2 schematically shows a magnetic disk and a magnetic head being in a floated (flying) state. As shown in FIG. 1, the HDD is provided with a housing 10. The housing 10 comprises a base 12 formed in the shape of a rectangular box which is open on its upper side, and a top cover (not shown) fixed to the base 12 by a plurality of screws to cover an upper opening of the base 12. The base 12 includes a rectangular bottom wall 12a and a side wall 12b provided upright along a peripheral edge of the bottom wall 12a.

In the housing 10 are arranged two magnetic disks 16 as recording mediums, and a spindle motor 18 provided as a driving section which supports and rotates the magnetic disks 16. The spindle motor 18 is disposed on the bottom wall 12a. The magnetic disks 16 are engaged coaxially with a hub (not shown) of the spindle motor 18, clamped by a clamp spring 27, and thereby fixed to the hub. The magnetic disks 16 are supported in parallel with the bottom wall 12a of the base 12. The magnetic disks 16 are rotated at a predetermined speed by the spindle motor 18 in a direction indicated by arrow A.

A plurality of magnetic heads 17 and a head stack assembly (hereinafter referred to as an HAS) 22 are arranged in the housing 10. The magnetic heads 17 are configured to write and read information on and from the magnetic disks 16, and the HSA 22 supports the magnetic heads 17 such that they are movable with respect to the magnetic disks 16. In the housing 10 are arranged a voice coil motor (VCM) 24, a ramp load mechanism 25, a latch mechanism 26 and a board unit 21. The VCM 24 rotates and positions the HSA 22, the ramp load mechanism 25 holds the magnetic heads 17 in unload positions where they are separated from the magnetic disks 16, when the magnetic heads 17 are moved to outermost circumferential part of the magnetic disks 16, the latch mechanism 26 holds the HAS in a retreat position when an impact or the like acts on the HDD, and the board unit 21 includes a conversion connector, etc. It should be noted that the latch mechanism 26 is not necessarily limited to a mechanical one, and a magnetic latch may be used.

A printed circuit board (not shown) is attached to an outer surface of the bottom wall 12a of the base 12. The printed circuit board controls operations of the spindle motor 18, the VCM 24 and the magnetic heads 17 through the board unit 21. A circulation filter 23 configured to capture dust caused in the housing 10 by the operations of the movable parts is provided on the side wall 12b of the base 12, and is positioned outside the magnetic disks 16. Further, a breather filter 15 configured to capture dust from the air flowing into the housing 10 is provided on the side wall 12b of the base 12.

As shown in FIG. 1, the HSA 22 comprises a rotatable bearing unit 28, four arms 32 attached to the bearing unit 28 in a stacked state, head gimbal assemblies (hereinafter referred to as HGAs) 30, and spacer rings (not shown) provided between the arms 32 arranged in the stacked state. Each of the arms 32 is formed of, for example, stainless steel, aluminum or the like into an elongate and thin plate-shape. Each arm 32 includes a distal end portion at its extended end side. At the distal end portion, a caulking seating face having a caulking hole (not shown) is formed.

As shown in FIGS. 1 and 2, each of the magnetic disks 16 comprises a substrate 101 formed of a nonmagnetic substance and in the shape of a disc having a diameter of approximately 2.5 inches (6.35 cm). On both surfaces of the substrate 101, soft magnetic layers 102, magnetic recording layers 103 and protection film layers 104 are stacked in this order. The soft magnetic layers 102 are provided as underlying layers and formed of material assuming a soft magnetic characteristic.

As shown in FIG. 2, each of the magnetic heads 17 is formed as a flying type head, and comprises a slider 31 formed in a substantially rectangular parallelepiped shape, and a head section 33 formed in an outflow end (trailing) side of the slider. Each magnetic head 17 is supported on a distal end portion of a suspension 34 by a gimbal portion 36 of a flexure, which will be described later. Each magnetic head 17 is flied by airflow B which is generated between a surface of the magnetic disk 16 and the slider 31 by rotation of the magnetic disk 16. The direction of airflow B is coincident with a rotating direction of the magnetic disk 16. The slider 31 is arranged such that its longitudinal direction is substantially coincident with the direction of airflow B with respect to the surface of the magnetic disk 16.

Next, structures of the HGAs 30 will be explained in detail. FIG. 3 is a plan view of each of the HGAs 30, and FIG. 4 is a perspective view of each HGA.

As shown in FIGS. 1, 3 and 4, the HGA 30 comprises the suspension 34 extending from the arm 32, and the magnetic head 17 supported on the extended end of the suspension 34.

The suspension 34, which functions as a supporting plate, includes a rectangular base plate 42 formed of a metal plate having a thickness of several hundreds of microns, and a load beam 35 formed of a metal plate with a thickness of tens of microns in a shape of an elongate and thin leaf spring. The load beam 35 has a proximal end portion located on a distal end portion of the base plate 42, and is fixed to the base plate 42 by welding a plurality of portions of the load beam 35. The proximal end potion of the load beam 35 has a width substantially equal to that of the base plate 42. An elongate and thin rod-shaped tab 46 is provided at the distal end of the load beam 35 in a protruding manner.

The base plate 42 includes, at a proximal-end portion thereof, a circular opening 42a, and annular protrusion 43 positioned around the opening 42a. By fitting the protrusion 43 of the base plate 42 in the circular caulking hole (not shown) formed in the seating face for caulking provided on the arm 32, and caulking the protrusion 43, the base plate 42 is fastened to the distal-end portion of the arm 32. The distal end of the base plate 42 may be fixed to the distal end of the arm 32 by spot welding or adhesion.

The HGA 30 comprises a pair of piezoelectric elements (PTZ elements) 50 and a flexure (wiring member) 40 formed in an elongate belt-shape and configured to transmit a recording signal and a reproduction signal for the magnetic head 17 and a drive signal for the piezoelectric elements 50. As shown in FIGS. 3 and 4, the flexure 40 includes a distal end portion 40a attached to upper surfaces of the load beam 35 and the base plate 42, and a posterior-half portion (extension portion) 40b extending outwards from a side edge of the base plate 42 and along a side edge of the arm 32. Also, the flexure 40 includes a connecting end portion 40c which is located at a distal end of the extension portion 40b, and also which is connected to a main FPC 21b which will be described later.

The distal end portion of the flexure 40, which is located on the distal end portion of the load beam 35, forms the gimbal portion 36. The magnetic head 17 and piezoelectric elements (drive members) 50 are mounted On the gimbal portion 36. The magnetic head 17 is fixed onto the gimbal portion 36, and is supported on the load beam 35 through the gimbal portion 36. The pair of piezoelectric elements (PZT elements) 50 are attached to the gimbal portion 36, and located in the vicinity of the magnetic head 17 on the proximal end side of the load beam 35 with respect to the magnetic head 17.

Figure 5:
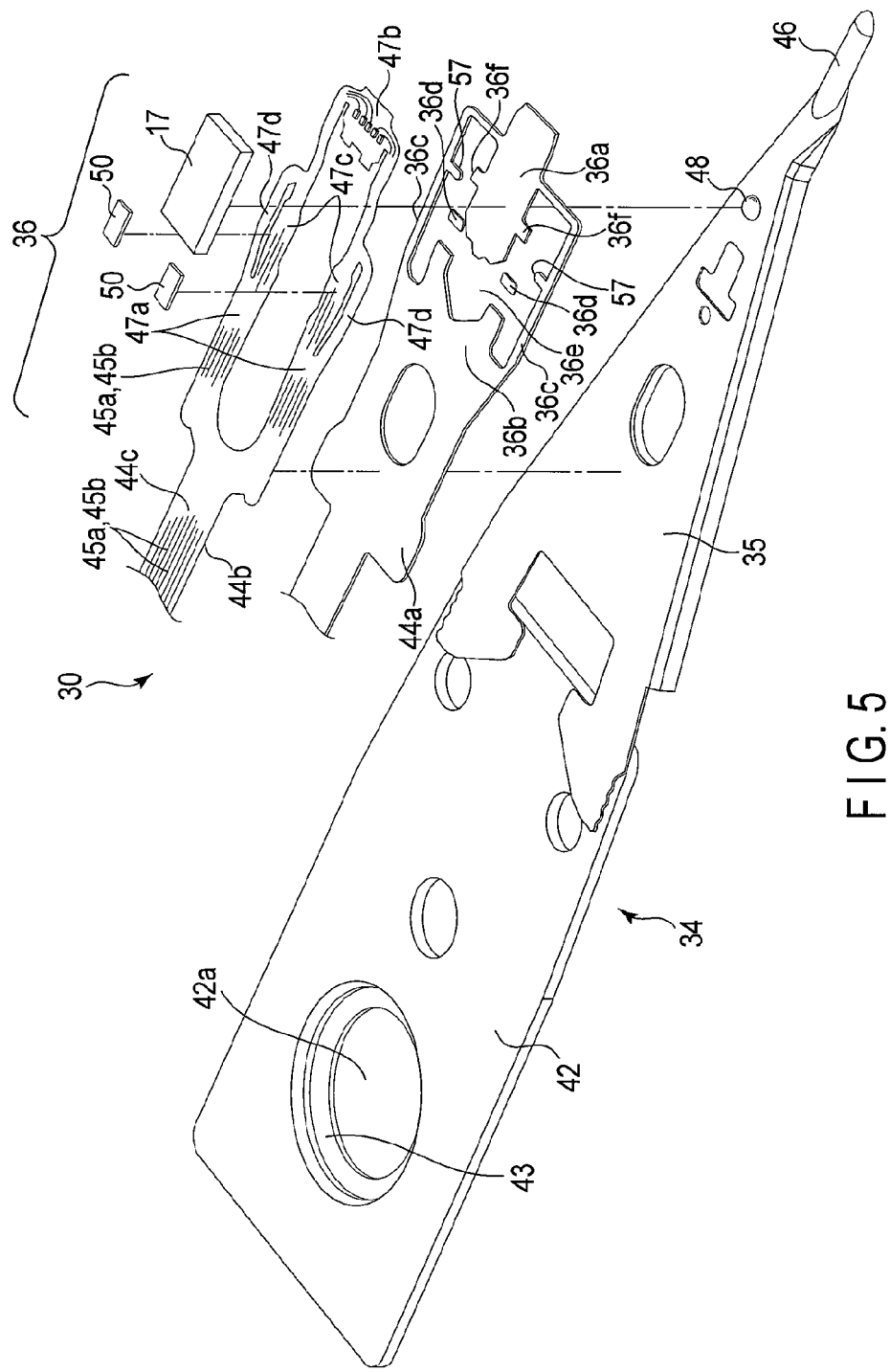
FIG. 5 is an exploded perspective view showing a load beam, a flexure, piezoelectric elements and a magnetic head of the head gimbal assembly.
Figure 6:
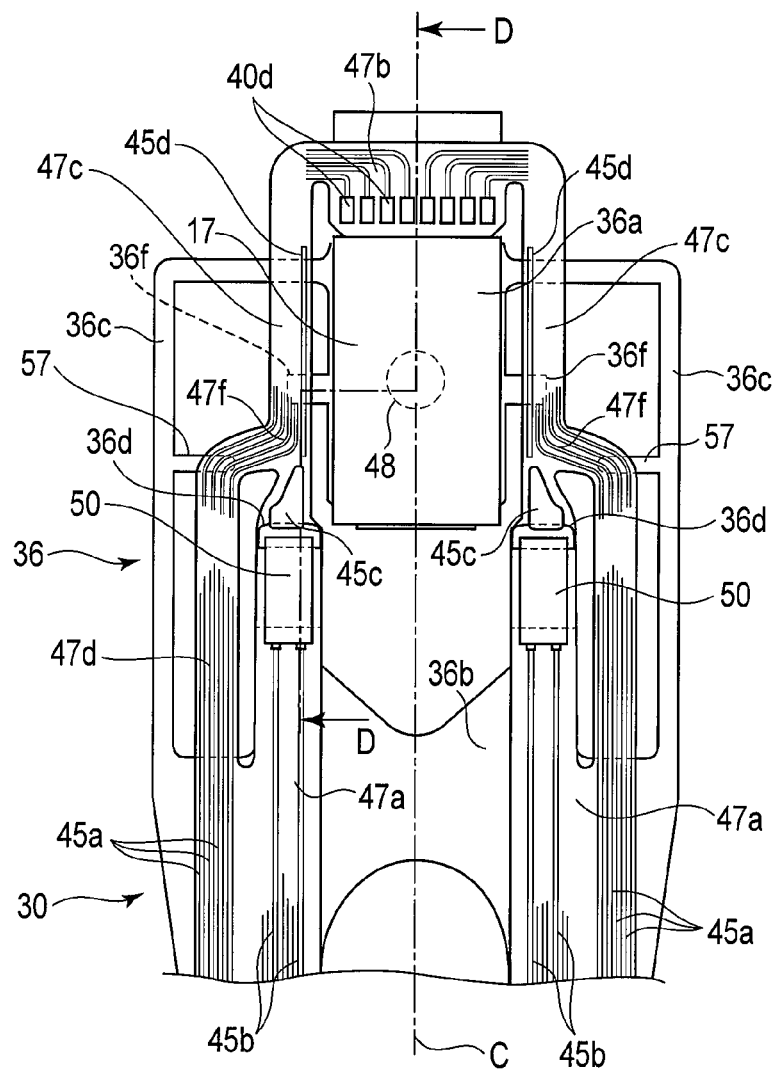
FIG. 6 is a plan view of a distal end portion of the head gimbal assembly.
Figure 7:
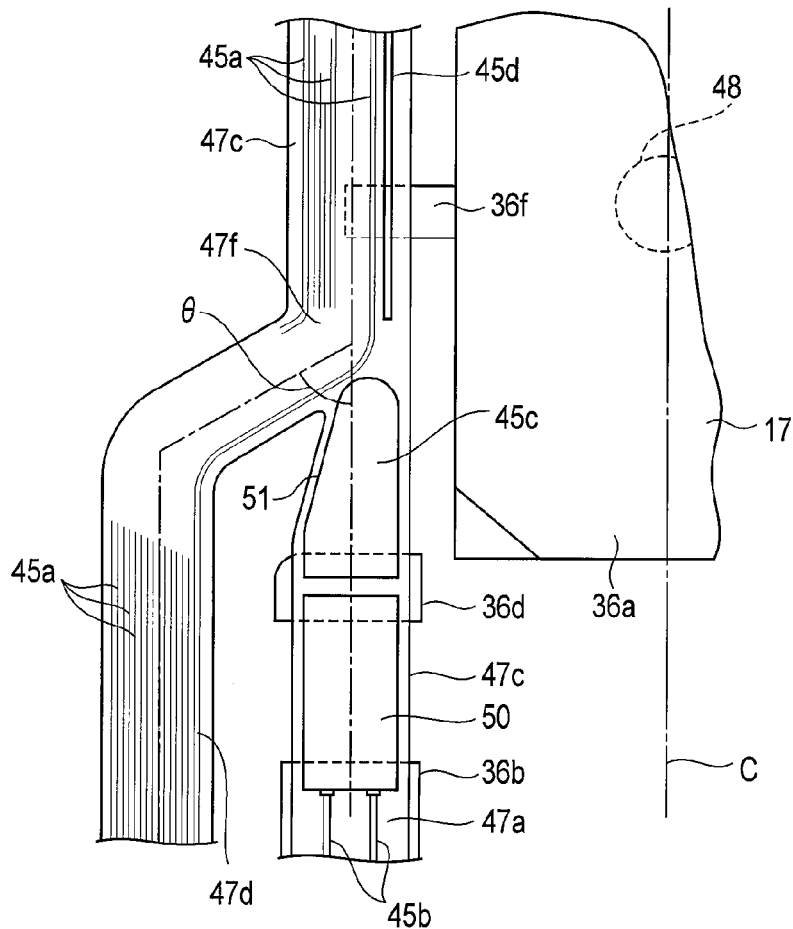
FIG. 7 is an enlarged plan view showing part of a gimbal portion of the head gimbal assembly.

FIG. 5 is an exploded perspective view of the magnetic head, the piezoelectric elements, the flexure and the load beam of each HGA 30; FIG. 6 is a plan view of the distal end portion of each HGA 30; and FIG. 7 is an enlarged plan view showing part of the gimbal portion.

As shown in FIGS. 3 to 6, the flexure 40 comprises a thin metallic plate (lining layer) 44a formed as a base and also formed of stainless or the like, an insulating layer 44b formed on the thin metallic plate 44a, a conductive layer (wiring pattern) 44c forming a plurality of signal wirings 45a and drive wirings 45b formed on the insulating layer 44b, and a protection layer (insulating layer, not shown). The flexure 40 constitutes an elongate-band shaped lamination plate. The flexure 40 is attached to the surfaces of the load beam 35 and base plate 42 at the thin metallic plate 44a side thereof by adhering or laser welding.

At the gimbal portion 36 of the flexure 40, the thin metallic plate 44a includes: a rectangular tongue portion 36a located at a distal end side of the gimbal portion 36; a rectangular proximal end portion 36b located on a proximal end side of the gimbal portion 36, with a space 36e interposed between the proximal end portion 36b and the tongue portion 36a; a pair of elongate outrigger portions (link portions) 36c extending from the tongue portion 36a to the proximal end portion 36b; a pair of island-shaped support portions 36d located between the tongue portion 36a and the proximal end portion 36b and also located in the space 36e; and a pair of handles (support projections) 36f projecting from both side edges of the tongue portion 36a.

The proximal end portion 36b is fixed onto a surface of the load beam 35 by laser welding or the like. The tongue portion 36a is arranged such that its central axis is coincident with a central axis C of the suspension 34. A substantially central portion of the tongue portion 36a is in contact with a dimple (convex portion) 48 that projects from the distal end portion of the load beam 35. Thereby, when the magnetic disk moves to the flutter direction, the tongue portion 36a and the magnetic head 17 mounted on the tongue portion 36a can flexibly follow to variation of the surface of the magnetic disk in a roll direction and a pitch direction and minutely fly. The pair of handles 36f are formed of thin metallic plate 44a integrally with the tongue portion 36a, and project from the both side edges of the tongue portion 36a in a direction substantially perpendicular to the center axis C. It should be noted that a member forming the handles (support projections) 36f is not limited to the thin metallic plate 44a; that is, the handles 36f may be formed of the conductive layer 44c stacked on the thin metallic plate 44a, the insulating layer 44b or the protection layer.

At the gimbal portion 36, part of the insulating layer 44b of the flexure 40 is formed to branch into two parts located on opposite sides with respect to the central axis C of the suspension 34. The insulating layer 44b includes: proximal end portions 47a fixed onto the proximal end portion 36b of the thin metallic plate 44a distal end portion 47b bonded onto the tongue portion 36a; a pair of band-shaped first bridge portions 47c extending from the proximal end portions 47a to the distal end portion 47b; and a pair of band-shaped second bridge portions 47d located abreast with the first bridge portions 47c and extending from the proximal end portions 47a to middle portions of the first bridge portions 47c to join the first bridge portions 47c. The first bridge portions 47c are located abreast with the outriggers 36c on the both sides of the tongue portion 36a, and extend in substantially parallel with the central axis C of the suspension 34, i.e., along the longitudinal direction of the load beam 35. Also, the first bridge portions 47c extend over the handles 36f and crossbars of the outriggers 36c, and are partially fixed to the handles 36f and the crossbars. It should be noted that the outriggers 36c may be provided between the tongue portion 36a and the first bridge portions 47c. If they are provided in such a manner, the first bridge portions 47c are partially fixed to the handles 36f.

As shown in FIGS. 6 and 7, the second bridge portions 47d are located between the first bridge portions 47c and the outriggers 36c, and extend abreast with the first bridge portions 47c and the outriggers 36c. The second bridge portions 47d join the first fridge portions 47c at joining portions 47f located close to the handles 36f. At the joining portions 47f, an angle θ between each of the first bridge portions 47c and a respective one of the second bridge portions 47d is set to fall within the range of 45° to less than 90°. The island-shaped support portions 36d of the thin metallic plate 44a are located between the joining portions 47f and the proximal end portion 47a and fixed to the first bridge portions 47c.

At the gimbal portion 36, the conductive layer 44c includes a plurality of signal wirings 45a extending from the proximal end portion 47a of the insulating layer 44b to the distal end portion 47b through the second bridge portions 47d, the joining portions 47f and the first bridge portions 47c; and drive wirings 45b extending from the proximal end portion 47a to middle portions of the first bridge portions 47c. The signal wirings 45a are connected to a plurality of electrode pads 40d provided at the distal end portion 47b. The conductive layer 44c includes reinforcement wiring portions 45c formed on the first bridge portions 47c in respective positions close to the joining portions 47f and the support portions 36d. The conductive layer 44c may include ground wirings or dummy wirings 45d which extend to the handle 36f over the first bridge portions 47c. It should be noted that the drive wirings 45b may be provided to extend from the proximal end portions 47a to the middle portions of the first bridge portions 47c through the second bridge portions 47d and the joining portions 47f, and be connected to drive members which will be described later.

Figure 8:
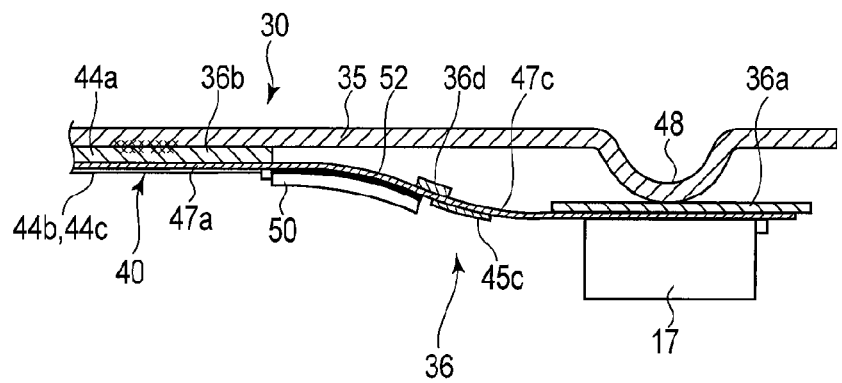
FIG. 8 is a cross-sectional view of the gimbal portion, which is taken along line D-D in FIG. 6.

As shown in FIGS. 7 and 8, one of end portions of each reinforcement wiring portion 45c is located to overlap with the support portion 36d, and the other is located to overlap with the joining portion 47f. In the embodiment, the reinforcement wiring portion 45c and the first bridge portion 47c include inclined edges 51 which gradually become narrower from the support portion (36d) side (i.e., the drive member side to be described later) toward the joining portion 47f such that they are inclined toward the central line C of the suspension. Since such inclined edges 51 are provided, it is possible to adjust a central position of rotation of the magnetic head 17, which accompanies extension and contraction of the piezoelectric elements 50, which will be described later, such that the central position of rotation is located above the central line C of the suspension.

As shown in FIG. 6, at the gimbal portion 36, the first bridge portions 47c, the second bridge portions 47d, the outriggers 36c and the wirings 45a and 45b are located on the both sides of the tongue portion 36a, and provided bilaterally symmetrical with respect to the central axis C of the suspension 34. In the embodiment, the gimbal portion 36 includes auxiliary bridges 57 located close to the joining portions 47f to extend between the outriggers 36c and the second bridge portions 47d. The auxiliary bridges 57 are formed of projections of the thin metallic plate 44a, which extend from the outriggers 36c.

As shown in FIGS. 3 to 7, the magnetic head 17 is fixed to the tongue portion 36a by an adhesive. The magnetic head 17 is arranged such that its axis is coincident with the central axis C of the suspension 34, and a substantially central portion of the magnetic head 17 is located on the dimple 48. Record and reproduction elements of the magnetic head 17 are electrically joined to the electrode pads 40d of the distal end portion 47b by soldering. Thereby, the magnetic head 17 is connected by the electrode pads 40d to the signal wirings 45a, which are provided to transmit a record and reproduction signal.

As the pair of piezoelectric elements 50, which serve as drive members, for example, thin film piezoelectric elements (PZT elements) formed in the shape of a rectangular plate are applied. The piezoelectric elements 50 are not limited to thin film type one; and a bulk type of or a bulk lamination type of piezoelectric elements may be applied as the piezoelectric elements 50. The piezoelectric elements 50 are not limited to PZT elements; that is, another type of piezoelectric elements may be applied as the piezoelectric elements 50. Furthermore, the drive members are not limited to the piezoelectric elements 50; that is, as the drive members, members configured to expand and contract by an applied voltage may be applied.

As shown in FIGS. 3 to 8, the two piezoelectric elements 50 are bonded to the first bridge portions 47c by an adhesive agent 52 or the like. The piezoelectric elements 50 are disposed such that the longitudinal direction of the piezoelectric elements 50 is parallel to longitudinal directions of the load beam 35 and bridge portions 47c. Thus, the piezoelectric elements 50 are arranged in parallel with each other and on the left and right sides of the magnetic head 17. However, the piezoelectric elements 50 may also be disposed in such a manner as to be inclined with respect to the longitudinal direction of the bridge portions 47c. For example, the two piezoelectric elements 50 may be arranged in an inverted V shape.

In the longitudinal direction of the piezoelectric elements 50, one of end portions of each piezoelectric element 50 is located to overlap with the proximal end portion 36b of the thin metallic plate 44a, and the other is bonded to the first bridge portion 47c, while overlapping with the support portion 36d. The piezoelectric elements 50 are electrically connected to the drive wirings 45b, which are provided to transmit a drive signal.

Figure 9:
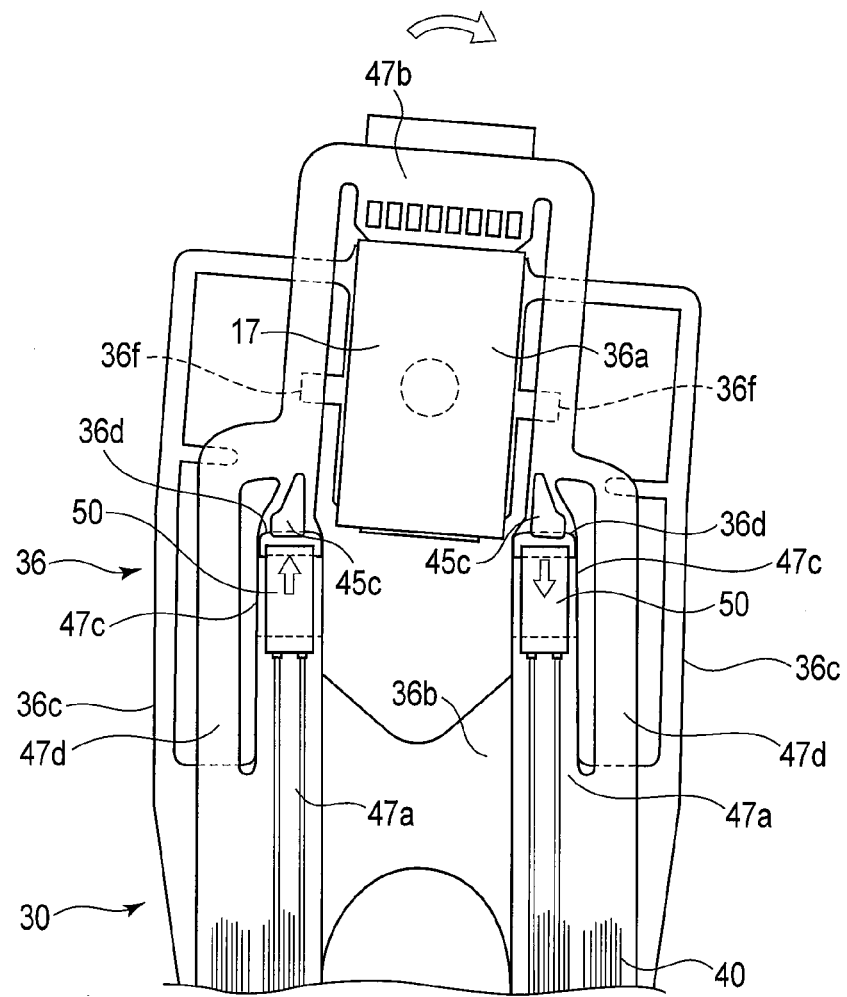
FIG. 9 is a plan view schematically showing a minute displacement state of a magnetic head due to a piezoelectric element.

The piezoelectric elements 50 are extended or contracted in their longitudinal direction when a voltage is applied to the piezoelectric elements 50 through the drive wirings 45b. To be more specific, as shown in FIG. 9, the piezoelectric elements 50 are driven in opposite directions where they expand and contract, to thereby cause the first bridge portions 47c to rock the tongue portion 36a of the gimbal portion 36 and also displace the magnetic head 17 in a seek direction.

As shown in FIG. 1, the HSA 22 includes a support frame extending from the bearing unit 28 in a direction away from the arms 32, and the support frame includes a voice coil which is embedded therein, and which forms part of the VCM 24. Each of the magnetic disks 16 is located between associated two of the HGAs 30, with the HSA 22 mounted in the base 12. While the HDD is being operated, the magnetic heads 17 of the HGAs 30 face upper and lower surfaces of the magnetic disks 16, and are located on both sides of the magnetic disks 16. The voice coil, which is fixed to the support frame, is located between a pair of yokes 37 fixed onto the base 12. The voice coil, the yokes 37 and a magnet (not shown) fixed to one of the yokes 37 constitute the VCM 24.

As shown in FIG. 1, the board unit 21 includes a main body 21a comprising a flexible printed circuit board. The main body 21a is fixed to the bottom wall 12a of the base 12. Electronic components (not shown) such as a conversion connector, etc. are mounted on the main body 21a. A connector (not shown) for connection with the print circuit board is mounted on a bottom surface of the main body 21a.

The board unit 21 includes a main flexible print circuit board (hereinafter referred to as a main FPC) 21b extending from the main body 21a. An extended end of the main FPC 21b forms a connecting end portion, and is fixed in the vicinity of the bearing unit 28 of the HSA 22. The connecting end portion 40c of the flexure 40 of each HGA 30 is mechanically and electrically connected to the connecting end portion of the main FPC 21b. Thereby, the board unit 21 is electrically connected to the magnetic heads 17 and the piezoelectric elements 50 by the main FPC 21b and the flexures 40.

As shown in FIG. 1, the ramp load mechanism 25 comprises a ramp 70 located on the bottom wall 12 of the base 12 and outward of the magnetic disks 16, and tubs 46 (see FIGS. 3 to 5) extending from the distal ends of the suspensions 34. In the case where the HSA 22 is rotated about the bearing unit 28, and the magnetic heads 17 are moved to retreat positions located outward of the magnetic disks 16, each of the tubs 46 is engaged with a ramped surface formed at the ramp 70, and then pulled upwards due to a slant of the ramped surface. As a result, the magnetic heads 17 are unloaded form the magnetic disks 16, and held in the retreat positions.

In the HDD and the HGA 30 with the above mentioned structure, the piezoelectric elements 50 are attached to the bridge portions 47c of the flexures (wiring member) 40, and a voltage is applied to the piezoelectric elements 50 through the flexures 40, thereby enabling the magnetic head 17 attached to the gimbal portion 36 to be displaced in the seeking direction. By virtue of this feature, it is possible to minutely control the position of the magnetic head 17 by controlling the voltage to be applied to the piezoelectric elements 50, and thus improve the accuracy of positioning of the magnetic head.

At each of the gimbal portions of the HGA 30, the tongue portion 36a includes the handles 36f projecting from the both side edges of the tongue portion 36a, and the first bridge portions 47c of the flexure 40 extend over the handles 36f. The handles 36f are located close to the dimple 48, and the center of rotation of the tongue portion 36a and the magnetic heads 17 can be adjusted by changing the locations of the handles 36f. Furthermore, for example, even when an impact is made, since the handles 36f themselves are warped, a stress on the first bridge portions 47c can be reduced. In addition, the reinforcement wiring portions 45c are provided close to the joining portions 47f of the first bridge portions 47c, to thereby prevent bending of the first and second bridge portions 47c and 47d at the time of driving the piezoelectric elements 50, while reducing a resonance level of the first bridge portions 47c, and also reduce a transmission loss of displacement of the piezoelectric elements 50.

At the joining portion 47f, the angle θ between the first bridge portion 47c and the second bridge portion 47d is set to fall within the range of 45° to less than 90°, to thereby reduce the influence of the second bridge portion 47d, which interfere with extension and contraction of the piezoelectric element 50 when they are driven as actuators. Furthermore, in the vicinity of the joining portions 47f, the auxiliary bridges 57 are provided between the outriggers 36c and the second bridge portions 47d, thus elastically supporting the second bridge portions 47d, reducing the resonance level, and also reducing the stress on the second bridge portions 47d when an impact or the like is made.

In addition, it can also be set that the dummy wirings or ground wirings are located at portions of the first bridge portions 47c, which are located closest to the tongue portion 36, to thereby cause a stress to act with concentration on the dummy wirings or ground wirings, and thus protect other wirings which need to function and the signal wirings 45a.

In the vicinity of the joining portions 47f, at the reinforcement wiring portions 45c and the first bridge portions 47c, the inclined edges 51 are provided such that they are inclined and their widths decrease from the piezoelectric element (50) side toward the central axis C of the suspension, and are connected to the joining portions 47f, as a result of which the center of rotation of a gimbal structure can be shifted to the piezoelectric element (50) side. Thereby, it can be expected that a driving force of the piezoelectric elements 50 can be efficiently transmitted without the need to increase stiffness of the gimbal portions 36.

By applying the above structure, it is possible to obtain a head gimbal assembly and a disk device, in which the stress on flexures (wiring members) is reduced, and the reliability is improved.

Next, HGAs according to the other embodiments and modifications will be explained. With respect to the other embodiments and modifications, elements identical to those in the first embodiment will be denoted by the same reference numerals and signs, and their detailed explanations will be omitted.

(First Modification)

Figure 10:
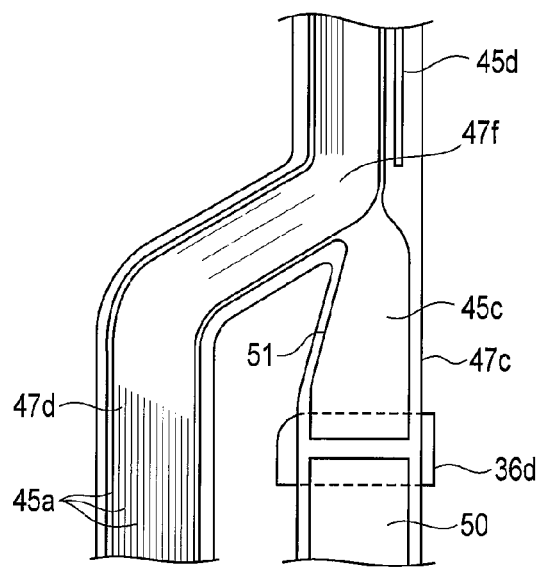
FIG. 10 is a plan view showing a reinforcement wiring portion of a head gimbal assembly according to a first modification.

FIG. 10 is an enlarged plan view showing a main portion of an HGA according to a first modification.

In this modification, each of reinforcement wiring portions 45c formed on first bridge portion 47c is formed continuous with a single signal wiring 45a.

(Second Modification)

Figure 11:
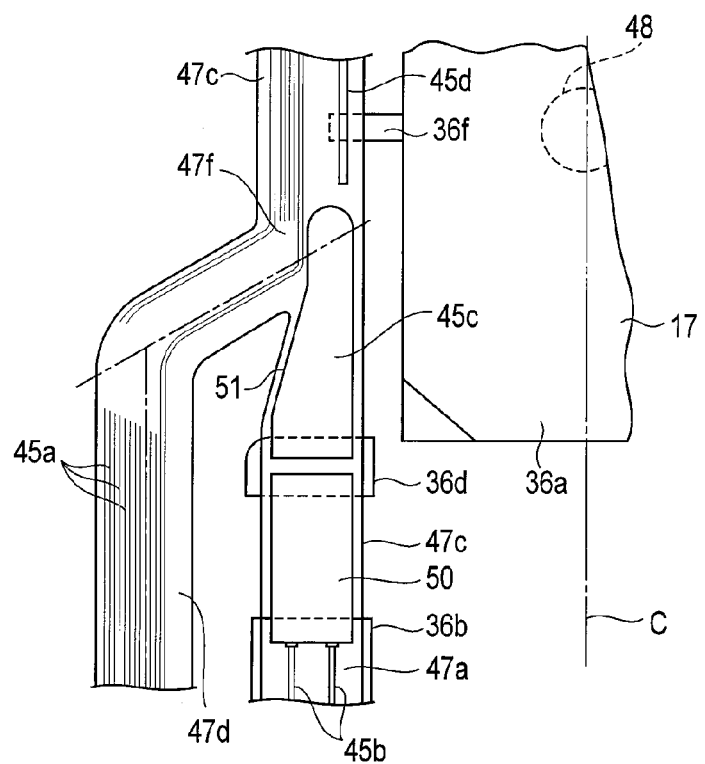
FIG. 11 is a plan view showing a reinforcement wiring portion of a head gimbal assembly according to a second modification.

FIG. 11 is an enlarged plan view showing a main portion of an HGA according to a second modification. In this modification, on sides where joining portions 47f are located, reinforcement wiring portions 45c formed on first bridge portions 47c include end portions which extend until they overlap with bent portions of signal wirings 45a of the joining portions 47f. That is, in the vicinity of the joining portions 47f, the signal wirings 45a over second bridge portions 47d extend in a direction perpendicular to a longitudinal direction of the first bridge portions 47c. Also, in this perpendicular direction, the reinforcement wiring portions 45c are located to overlap with the signal wirings 45a.

By virtue of the above structure, at the time of driving piezoelectric elements 50, it is possible to prevent bending or like of wirings extending in a direction perpendicular to the extending and contracting directions of the piezoelectric elements 50, i.e., in the direction perpendicular to the longitudinal direction of the first bridge portions 47c.

Second Embodiment

FIG. 12 is a plan view showing each of gimbal portions in an HGA according to a second embodiment. In this embodiment, auxiliary bridges 57 are formed of projections of an insulating layer 44b, which project from second bridge portions 47d. The auxiliary bridges 57 project from the second bridge portions 47d, and their distal end portions are connected to outriggers 36c.

(Third Modification)

FIG. 13 is an enlarged plan view viewing each of auxiliary bridge portions in an HGA according to a third modification. As in the third modification, each of auxiliary bridges 57 may be formed of both a projection 57a of a thin metallic plate 44a, which projects from an outrigger 36c, and a projection 57b of an insulating layer 44b, which projects from a second bridge portion 47d. In this case, the projections 57a and 57b may be bonded to each other, or a projection end of the projection 57a may be bonded to the second bridge portion 47d, and a projection end of the projection 57b may be bonded to the outrigger 36c.

Third Embodiment

Figure 14:
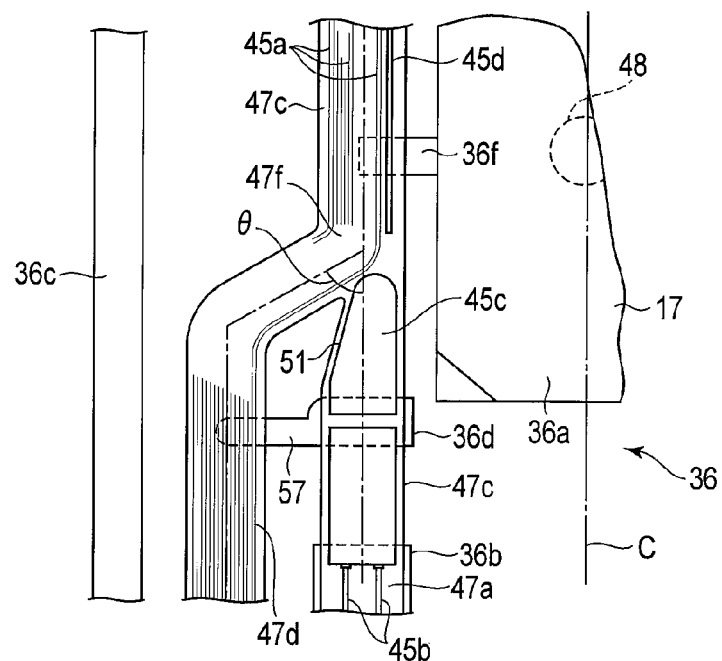
FIG. 14 is a plan view showing an auxiliary bridge portion in a head gimbal assembly according to a third embodiment.

FIG. 14 is a plan view showing a gimbal portion of an HGA according to a third embodiment. In this embodiment, auxiliary bridges 57 are provided between second bridge portions 47d and island-shaped support portions 36d of a thin metallic plate 44a. The auxiliary bridges 57 may be formed of projections of the thin metallic plate 44a, which project from the support portions 36d. Furthermore, the auxiliary bridges 57 may be formed of a conductive layer 44c and an insulating layer 44b, and may also be formed of lamination of portions of the thin metallic plate 44a, the conductive layer 44c and the insulating layer 44b. It should be noted that projection end portions of the auxiliary bridges 57 may be bonded to second bridge portions 47d.

(Fourth Modification)

Figure 15:
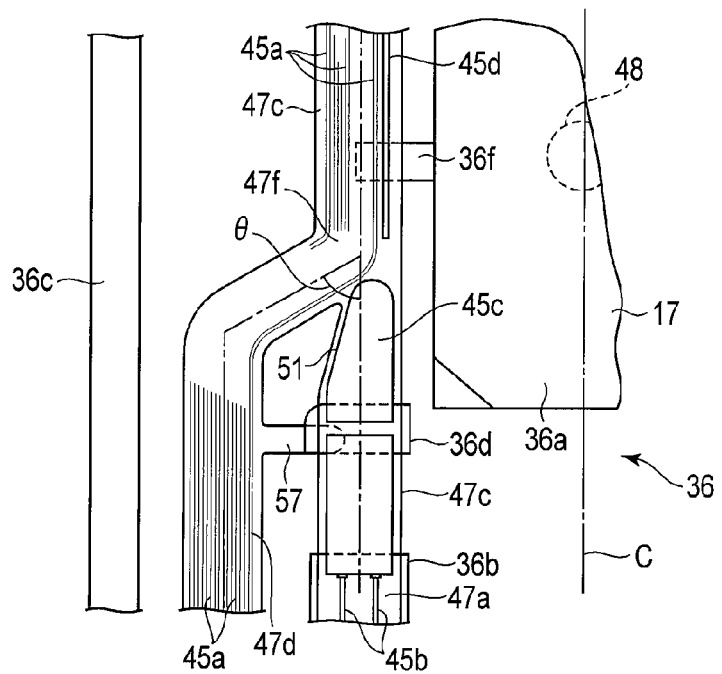
FIG. 15 is a plan view showing an auxiliary bridge portion in a head gimbal assembly according to a fourth modification.

FIG. 15 is an enlarged plan view showing an auxiliary bridge portion of an HGA 30 according to a fourth modification. As in the fourth modification, auxiliary bridges 57 provided between support portions 36d and second bridge portions 47d may be formed of projections of an insulating layer 44b, which project from second bridge portions 47d. Projection end portions of the projections may be bonded to support portions 36d.

Fourth Embodiment

Figure 16:
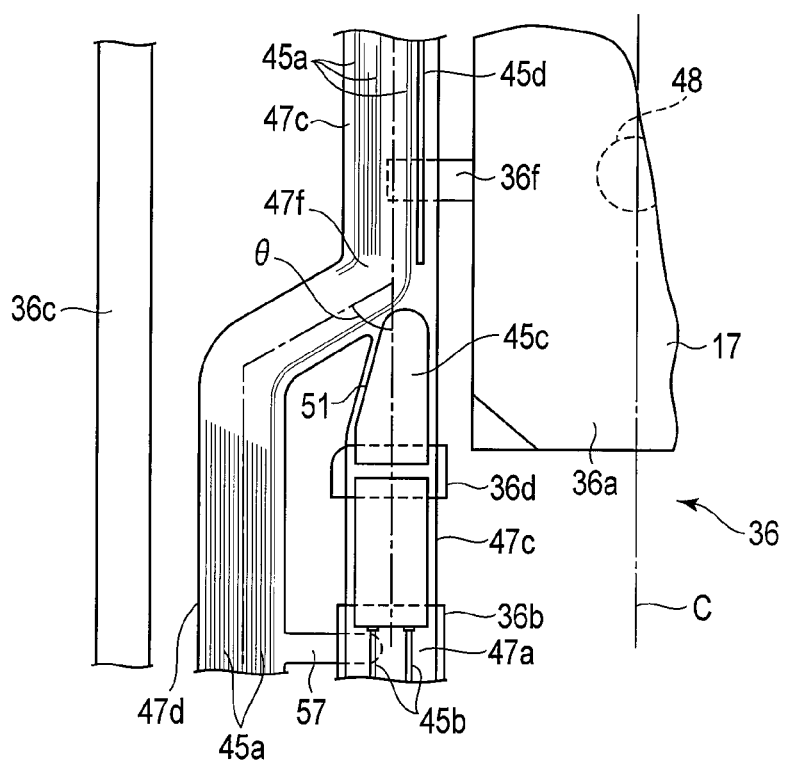
FIG. 16 is a plan view showing an auxiliary bridge portion in the head gimbal assembly according to a fourth embodiment.

FIG. 16 is a plan view showing a gimbal portion of an HGA according to a fourth embodiment. In this embodiment, auxiliary bridges 57 are provided between proximal end portions 47a and second bridge portions 47d. The auxiliary bridges 57 are formed of projections of an insulating layer 44b, which project from the second bridge portions 47d. The auxiliary bridges 57 may be formed of projections projecting from proximal end portions 36b formed of gold-foil plates.

Also, the auxiliary bridges 57 may be formed of projections of an insulating layer 44b, which project from a proximal end portion (47a) side.

Fifth Embodiment

Figure 17:
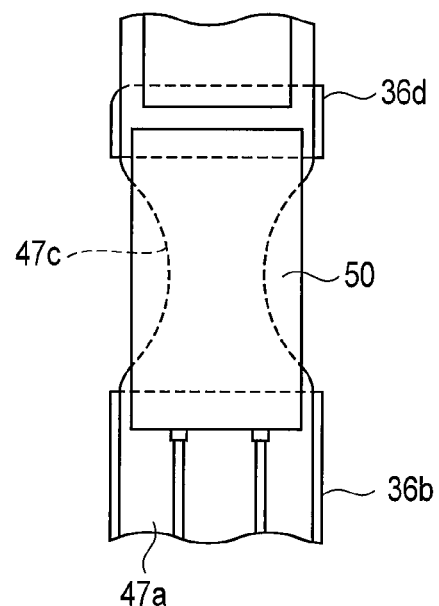
FIG. 17 is a plan view showing a piezoelectric-element mounting portion in a head gimbal assembly according to a fifth embodiment.

FIG. 17 is a plan view showing bridge portions and piezoelectric elements in an HGA according a fifth embodiment. In the fifth embodiment, first bridge portions 47c are constricted in the middle such that in their longitudinal direction, intermediate portions of part of the first bridge portions 47c, on which piezoelectric elements 50 are stacked, are thinner than both end portions of the above part of the first bridge portions 47c.

In the above structure, since the first bridge portions 47c are constricted in the middle, they have appropriate stiffness, i.e., their stiffness is not excessively high, and thus they do not interfere with extension and contraction of the piezoelectric elements 50. Thus, a driving force of the piezoelectric elements 50 can be more stably transmitted to the first bridge portions 47c.

Sixth Embodiment

Figure 18:
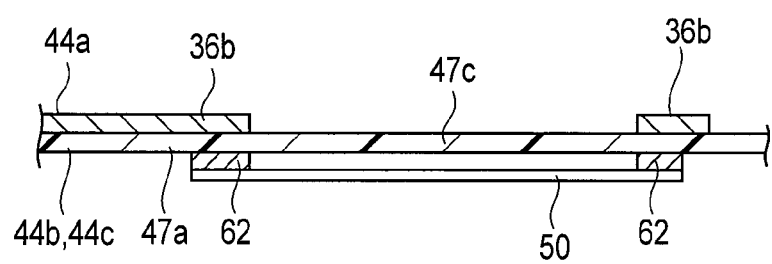
FIG. 18 is a cross-sectional view showing a piezoelectric-element mounting portion in a head gimbal assembly according to a sixth embodiment.

FIG. 18 is a cross-sectional view showing a bridge portion and a piezoelectric element of an HGA according to a sixth embodiment. In this embodiment, both end portions of piezoelectric elements (PZT elements) 50 serving as drive members, which are located at their ends in their longitudinal direction, are joined to first bridge portions 47c by silver past or solder 62, and center portions of the piezoelectric elements 50 are not made to adhere to the first bridge portions 47c; i.e., they are located opposite to the first bridge portion 47c, with gaps provided between the center portions and the bridge portions 47c. Thus, the bridge portions 47c do not interfere with extension and contraction of the piezoelectric elements 50.

Seventh Embodiment

FIGS. 19 and 20 are a plan view and a cross-sectional view showing a gimbal portion of an HGA according to a seventh embodiment. In the seventh embodiment, a sheeted damper (viscoelastic member) 64 formed of viscoelastic material is bonded to overlap with an upper surface of a load beam 35 (which is a surface located opposite to a flexure 40) and proximal end portions 47a of an insulating layer 44b. The damper 64 may be bonded to any or some of piezoelectric elements 50, support portions 36d of a thin metallic plate 44a, reinforcement wiring portions 45c and joining portions 47f of first bridge portions 47c. Due to provision of such a damper 64, a resonance peak of the gimbal portion 36 can be further reduced.

According to any of the above first to fourth modifications and the second to seventh embodiments, it is possible to obtain a head gimbal assembly and a disk device, in which the resonance peak of a gimbal portion is reduced, a stress acting on a flexure (wiring member) when an impact is made is also reduced, and the reliability is improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In the above embodiments, as the arms of the HAS, plate-shaped arms formed independent of each other are applied. However, the arms of the HAS are not limited to the plate-like arms; that is, arms to be applied may be formed in the shape of so-called E-type block and integral with bearing sleeves. Furthermore, the size of each of the magnetic disks is not limited to 2.5 inch; that is, magnetic disks each having another size may be applied. The number of magnetic disks is not limited to two; that is, a single magnetic disk or three or more magnetic disks may be applied. Also, the number of HGAs may be changed in accordance with the number of magnetic disks.

What is claimed is:

1. A wiring assembly comprising:
a wiring member comprising a metallic plate, an insulating layer on the metallic plate, and a conductive layer on the insulating layer, wherein the metallic plate comprises a proximal end portion, a tongue portion located apart from the proximal end portion; the insulating layer comprises a distal end portion on the tongue portion, a pair of first bridge portions extending from the proximal end portion to the distal end portion along both sides of the tongue portion, and a pair of second bridge portions extending from the proximal end portion to middle portions of the first bridge portions to join the first bridge portions; and the conductive layer comprises a plurality of wirings being through the first bridge portions and the second bridge portions; and
a drive member fixed to each of the first bridge portions in a position between the proximal end portion and the middle portion, connected to at least one of the wirings, and configured to expand and contract between the proximal end portion and the middle portion.

2. The wiring assembly of claim 1, wherein the metallic plate comprises a pair of projection portions projecting from the tongue portion.

3. The wiring assembly of claim 2, wherein the metallic plate comprises a pair of link portions extending along the both sides of the tongue portion and connecting the proximal end portion and the tongue portion.

4. The wiring assembly of claim 2, wherein each of the first bridge portions comprises a part fixed to the projection portion.

5. The wiring assembly of claim 1, wherein the conductive layer comprises reinforcement wiring portions provided at the middle portions.

6. The wiring assembly of claim 1, wherein the metallic plate comprises a pair of link portions extending along the both sides of the tongue portion and connecting the proximal end portion and the tongue portion.

7. A head wiring assembly comprising:
a support plate including a convex portion;
a wiring member attached to the support plate and comprising a metallic plate, an insulating layer on the metallic plate, and a conductive layer on the insulating layer, wherein the metallic plate comprises a proximal end portion fixed to the support plate, a tongue portion located apart from the proximal end portion and located over the convex portion; the insulating layer comprises a distal end portion on the tongue portion, a pair of first bridge portions extending from the proximal end portion to the distal end portion along both sides of the tongue portion, and a pair of second bridge portions extending from the proximal end portion to middle portions of the first bridge portions to join the first bridge portions; and the conductive layer comprises a plurality of wirings being through the first bridge portions and the second bridge portions;
a drive member fixed to each of the first bridge portions in a position between the proximal end portion and the middle portion, connected to at least one of the wirings, and configured to expand and contract between the proximal end portion and the middle portion; and
a magnetic head attached to the tongue portion and electrically connected to a part of the wirings.

8. The head wiring assembly of claim 7, wherein the metallic plate comprises a pair of projection portions projecting from the tongue portion and located close to the convex portion.

9. The head wiring assembly of claim 8, wherein the metallic plate comprises a pair of link portions extending along the both sides of the tongue portion and connecting the proximal end portion and the tongue portion.

10. The head wiring assembly of claim 8, wherein each of the first bridge portions comprises a part fixed to the projection portion.

11. The head wiring assembly of claim 7, wherein the conductive layer comprises reinforcement wiring portions provided at the middle portions.

12. The head wiring assembly of claim 7, wherein the metallic plate comprises a pair of link portions extending along the both sides of the tongue portion and connecting the proximal end portion and the tongue portion.

13. A disk device comprising:
   a disk recording medium; and
   the head wiring assembly of claim 7.

14. The disk device of claim 13, wherein the metallic plate comprises a pair of projection portions projecting from the tongue portion and located close to the convex portion.

15. The disk device of claim 14, wherein the metallic plate comprises a pair of link portions extending along the both sides of the tongue portion and connecting the proximal end portion and the tongue portion.

16. The disk device of claim 14, wherein each of the first bridge portions comprises a part fixed to the projection portion.

17. The disk device of claim 13, wherein the conductive layer comprises reinforcement wiring portions provided at the middle portions.

18. The disk device of claim 13, wherein the metallic plate comprises a pair of link portions extending along the both sides of the tongue portion and connecting the proximal end portion and the tongue portion.

\* \* \* \* \*